(12) United States Patent
Higuchi et al.

(10) Patent No.: US 11,905,036 B2
(45) Date of Patent: Feb. 20, 2024

(54) AUTONOMOUS MOBILE BASE APPARATUS FOR CHARGING UAVS

(71) Applicant: KYOCERA Corporation, Kyoto (JP)

(72) Inventors: Takeshi Higuchi, Yokohama (JP); Toi Kanda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 566 days.

(21) Appl. No.: 17/052,850

(22) PCT Filed: Apr. 23, 2019

(86) PCT No.: PCT/JP2019/017259
§ 371 (c)(1),
(2) Date: Nov. 4, 2020

(87) PCT Pub. No.: WO2019/230266
PCT Pub. Date: Dec. 5, 2019

(65) Prior Publication Data
US 2021/0237900 A1  Aug. 5, 2021

(30) Foreign Application Priority Data

May 29, 2018  (JP) ................. 2018-102532

(51) Int. Cl.
| | | |
|---|---|---|
| *G01C 21/26* | (2006.01) | |
| *B64F 1/00* | (2006.01) | |
| *B60L 58/12* | (2019.01) | |
| *B60W 60/00* | (2020.01) | |
| *B64C 39/02* | (2023.01) | |
| *B64F 1/18* | (2006.01) | |
| *B64F 1/36* | (2017.01) | |

(Continued)

(52) U.S. Cl.
CPC .............. *B64F 1/007* (2013.01); *B60L 58/12* (2019.02); *B60W 60/0025* (2020.02); *B64C 39/024* (2013.01); *B64F 1/18* (2013.01); *B64F 1/364* (2013.01); *B60L 2200/10* (2013.01); *B64U 10/13* (2023.01); *B64U 50/19* (2023.01); *B64U 80/86* (2023.01)

(58) Field of Classification Search
CPC .. B64F 1/007; B64F 1/18; B64F 1/364; B60L 58/12; B60L 2200/10; B60W 60/0025; B64U 10/13; B64U 80/86; B64U 50/19; B64C 39/024
See application file for complete search history.

(56) References Cited

U.S. PATENT DOCUMENTS 6,401,029 B1  6/2002  Kubota et al.
7,630,831 B2  12/2009  Hagiwara
(Continued)

FOREIGN PATENT DOCUMENTS

JP  2000-266551 A  9/2000
JP  2007-057375 A  3/2007
(Continued)

*Primary Examiner* — Jess Whittington
*Assistant Examiner* — Rami Nabih Bedewi
(74) *Attorney, Agent, or Firm* — Studebaker & Brackett PC (57) ABSTRACT

A base apparatus for docking of at least one flying apparatus includes a controller. The controller outputs information of a location to which the base apparatus is to be moved, the location being determined based on a predetermined condition including a condition related to the battery level of the at least one flying apparatus.

9 Claims, 6 Drawing Sheets

(51) Int. Cl.
    *B64U 10/13*     (2023.01)
    *B64U 50/19*     (2023.01)
    *B64U 80/86*     (2023.01)

(56) References Cited

U.S. PATENT DOCUMENTS

| | | | |
|---|---|---|---|
| 8,963,493 B2 | 2/2015 | Yano et al. | |
| 10,195,629 B1* | 2/2019 | Dahlstrom | G05D 1/0088 |
| 2013/0134934 A1 | 5/2013 | Yano et al. | |
| 2017/0344000 A1* | 11/2017 | Krishnamoorthy | G08G 5/0013 |
| 2018/0265222 A1 | 9/2018 | Takagi | |

FOREIGN PATENT DOCUMENTS

| | | | |
|---|---|---|---|
| JP | 2016175490 A | 10/2016 |
| JP | 2017105242 A | 6/2017 |
| KR | 10-2016-0015714 A | 2/2016 |
| WO | 2012120736 A1 | 9/2012 |
| WO | 2017170614 A1 | 10/2017 |

* cited by examiner

AUTONOMOUS MOBILE BASE APPARATUS FOR CHARGING UAVS

CROSS-REFERENCE TO RELATED APPLICATION

The present application claims priority to and the benefit of Japanese Patent Application No. 2018-102532 filed May 29, 2018, the entire contents of which are incorporated herein by reference.

TECHNICAL FIELD

The present disclosure relates to a base apparatus, a control method of a base apparatus, and a control program of a base apparatus. In greater detail, the present disclosure relates to a base apparatus for docking of a flying apparatus such as a drone, a control method of such a base apparatus, and a control program of such a base apparatus.

BACKGROUND

In recent years, flying apparatuses that are typically unmanned, such as drones, have rapidly become popular. For example, flying apparatuses such as a small, unmanned multicopter with an imaging device such as a camera mounted thereon are commercially available. Such a flying apparatus can capture still images, video, or the like from places that a person cannot easily reach. Such small, unmanned flying apparatuses are expected to continue to grow in popularity as their applications expand and as laws are passed.

When the above-described flying apparatus is driven by battery power, the flying apparatus needs to land at a predetermined location before the battery power runs out. A takeoff and landing apparatus has therefore been proposed as a base for the flying apparatus to take off from and land on. For example, patent literature 1 (PTL 1, JP 2016-175490 A) discloses a takeoff and landing apparatus that guides a flying apparatus to the proper landing position if the flying apparatus deviates slightly from the proper position when landing.

SUMMARY

A base apparatus according to an embodiment is for docking of at least one flying apparatus. The base apparatus includes:

a controller configured to output information of a target location to which the base apparatus is to be moved, the target location being determined based on a predetermined condition including a condition related to a battery level of the at least one flying apparatus.

A control method according to an embodiment is a control method of a base apparatus for docking of at least one flying apparatus. The control method includes:

determining a target location to which the base apparatus is to be moved based on a predetermined condition including a condition related to a battery level of the at least one flying apparatus; and outputting information of the target location.

A control program according to an embodiment is a control program of a base apparatus for docking of at least one flying apparatus. The control program causes a computer of the base apparatus to:

determine a target location to which the base apparatus is to be moved based on a predetermined condition including a condition related to a battery level of the at least one flying apparatus; and output information of the target location.

DETAILED DESCRIPTION

A base apparatus suitable for docking of a flying apparatus can improve convenience when the flying apparatus is operated. The present disclosure relates to providing a base apparatus that improves convenience when a flying apparatus is operated, a control method of the base apparatus, and a control program of the base apparatus. An embodiment provides a base apparatus that improves convenience when a flying apparatus is operated, a control method of the base apparatus, and a control program of the base apparatus.

A base apparatus according to an embodiment can be a docking apparatus for docking of a flying apparatus. Here, a flying apparatus can be a small flying apparatus that is typically unmanned, such as a drone. A docking apparatus for docking of a flying apparatus may be an apparatus used in applications such as a base for docking of a flying apparatus. An example is a docking station. By enabling the flying apparatus to dock, the docking apparatus may communicate with the flying apparatus and may charge a battery of the flying apparatus.

A base apparatus according to an embodiment is described below in detail with reference to the drawings.

Figure 1:
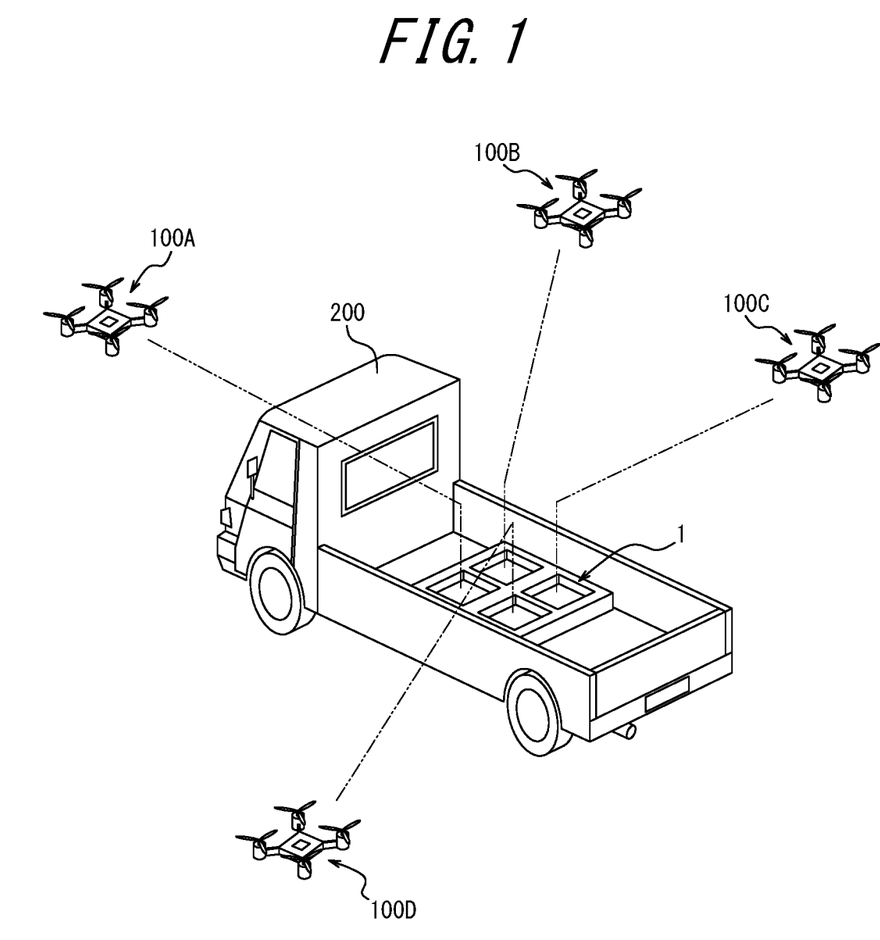
FIG. 1 is a perspective view of the appearance of a flying apparatus and a base apparatus according to an embodiment.

FIG. 1 is a perspective view illustrating a base apparatus according to an embodiment together with flying apparatuses. As illustrated in FIG. 1, the base apparatus 1 according to an embodiment is for docking of a flying apparatus. For example, the base apparatus 1 can enable at least one of the flying apparatuses 100A, 100B, 100C, 100D to land and dock. The base apparatus 1 can enable the flying apparatuses 100A, 100B, 100C, 100D that are docked on the base apparatus 1 to take off (separate). The flying apparatuses 100A, 100B, 100C, 100D that separate from the base apparatus 1 can fly and/or float in the air. When no distinction need be made, the flying apparatuses 100A, 100B, 100C, 100D may simply be referred to as the "flying apparatus 100" below. The flying apparatuses 100A, 100B, 100C, 100D may be the same type of flying apparatus or may be different types of flying apparatuses.

The base apparatus 1 illustrated in FIG. 1 can enable a maximum of four flying apparatuses 100 to dock. However, the number of flying apparatuses 100 that can dock on the base apparatus 1 is not limited. In accordance with specifications, needs, or the like, the base apparatus 1 may enable any number, one or greater, of flying apparatuses 100 to dock. The configuration of each functional component of the base apparatus 1 according to an embodiment is further described below.

The base apparatus 1 illustrated in FIG. 1 is configured for docking of the flying apparatus 100 in each recessed portion. The base apparatus 1 is not, however, limited to the configuration illustrated in FIG. 1 and may have any configuration that enables the flying apparatus 100 to land and dock. For example, the base apparatus 1 need not include the recessed portions illustrated in FIG. 1. The base apparatus 1 may also, for example, include any lock mechanism capable of securing a docked flying apparatus 100.

As illustrated in FIG. 1, the base apparatus 1 according to an embodiment may be provided in transportation means 200, which may be a truck, for example. The transportation means 200 illustrated in FIG. 1 includes a loading platform. The base apparatus 1 is installed on the loading platform. The transportation means 200 in an embodiment is not limited to being a truck and can be any of various automobiles, such as a sedan, a sport utility vehicle (SUV), or a minivan. When, as in the case of these automobiles, the transportation means 200 does not include a loading platform, the base apparatus 1 may be installed on a location such as the roof of the automobile. The transportation means 200 may be a trailer towed by a tractor. In this case, the base apparatus 1 may be installed on the loading platform, the roof, or the like of the trailer. As described below, the transportation means 200 may be driven (operated) by a human as in a regular automobile or may be autonomously driven, without a human driver (operator).

FIG. 1 illustrates an example of the transportation means 200 being an automobile. Examples of automobiles include gasoline cars, hybrid cars, electric cars, sedan-type cars, trucks, buses, taxis, and cars that are autonomously driven by AI, a computer, or the like. The transportation means 200 is not limited to being an automobile, however, and may be another vehicle that runs on land. For example, the transportation means 200 may be a motorcycle, a trike, a bicycle, or the like. In this case, the base apparatus 1 may be installed at any location on the motorcycle or the like or may be installed on a trailer or loading platform (cart) towed by the motorcycle or the like. When the base apparatus 1 is installed on a trailer or loading platform (cart) in this way, the trailer or loading platform (cart) may be towed by human power.

Furthermore, the transportation means 200 is not limited to movement on land, like an automobile. The transportation means 200 may, for example, be a ship or the like that navigates on water. The transportation means 200 may also be a flying apparatus that flies and/or floats in the air (a parent flying apparatus for docking of a child flying apparatus).

In an embodiment, the flying apparatus 100 may be an apparatus including various flying functions capable of floating in the air even when moving at low speed in the horizontal direction. The flying apparatus may, for example, be a small helicopter that is typically unmanned, a multicopter, a drone, an airship, a balloon, or an unmanned aerial vehicle (UAV). Here, a drone may be used in various applications. For example, a drone may include a CCD image sensor and be used for capturing images during flight. A drone may also be used for transporting components used in a factory, for example, from one location to another. A drone may be used for spraying pesticides or the like in agricultural applications, for example. A drone may be used for transporting packages during distribution, for example. A drone may be used to confirm the status of a structure, such as a bridge or building, by capturing an image of the structure with a camera or the like. A drone may be used to confirm the status of a solar panel, for example. A drone may be used for chasing away animals, for example. A drone may be used as a monitoring apparatus such as a status monitor. A drone may be used for military purposes. In an embodiment, the flying apparatus 100 may be capable of wireless remote control or of autonomous control (autopilot). The flying apparatus 100 may, for example, be controlled remotely (autopilot) over radio by an external device. In the present disclosure, the size of the drone is not restricted. The size of the drone may, for example, be any size in a range from several millimeters to several hundred meters. The drones of the present disclosure may include drones with wings. In the present disclosure, the weight of the drone is not restricted. The weight of the drone may, for example, be any weight in a range from several grams to several hundred kilograms.

The flying apparatus 100 is not limited to the configuration illustrated in FIG. 1 and may be any flying apparatus. An example is described below in which the flying apparatus 100 is a drone that includes one or more propellers (or blades, rotors, or the like), such as the four propellers illustrated in FIG. 1. The configuration of each functional component of the flying apparatus 100 according to an embodiment is further described below.

Figure 2:
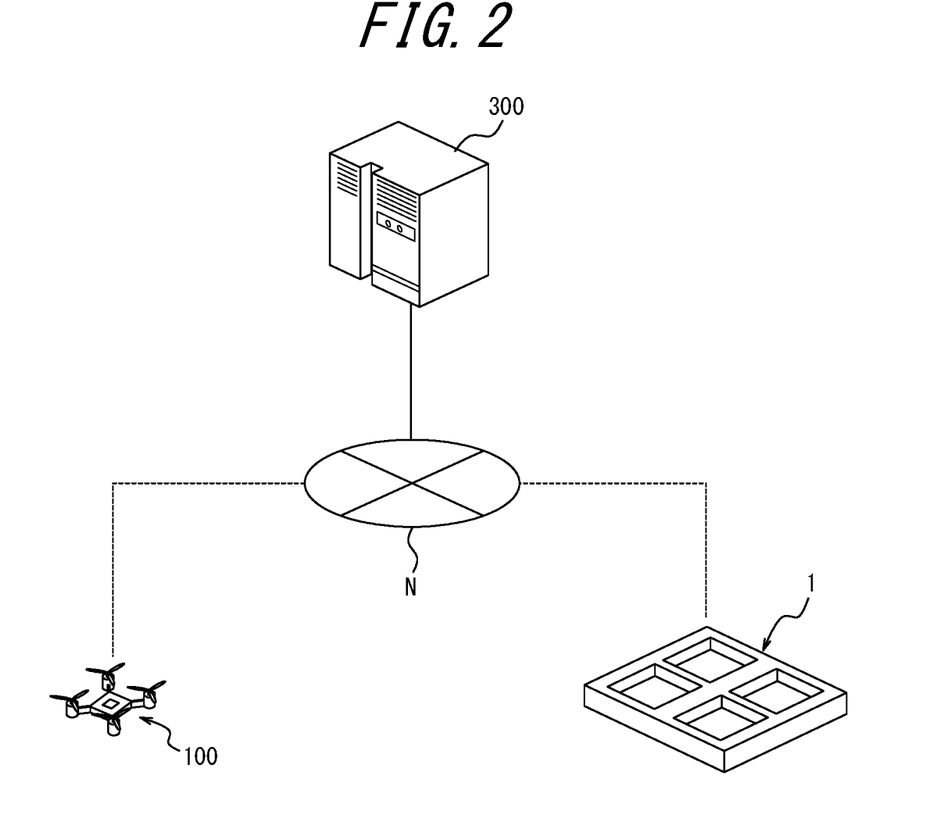
FIG. 2 illustrates communication between the flying apparatus and the base apparatus according to an embodiment.

FIG. 2 illustrates communication between the base apparatus 1 according to an embodiment and the flying apparatus 100.

As described below, both the base apparatus 1 according to an embodiment and the flying apparatus 100 each include a communication interface. Accordingly, as illustrated in FIG. 2, the base apparatus 1 and the flying apparatus 100 can communicate wirelessly with each other over a network N, for example. The network N is configured to be wired, wireless, or any combination of wired and wireless. The base apparatus 1 and the flying apparatus 100 may each connect to a server 300 over the network N. The server 300 may be any of various types of servers managed by the business that operates the base apparatus 1 or the flying apparatus 100, for example. The server 300 may, for example, be a cloud server. For example, in the present disclosure, the base apparatus 1 and the flying apparatus 100 may be connected wirelessly, and the flying apparatus 100 and the network N may be connected wirelessly. In the present disclosure, at least one section between the server 300 and the network N may be wired, for example. The network N of the present disclosure may have a different configuration than the above configurations.

The base apparatus 1 and the flying apparatus 100 can each transmit various information to the server 300 by communicating with the server 300. The base apparatus 1 and the flying apparatus 100 can each receive various information from the server 300 by communicating with the server 300. In this way, when the flying apparatus 100 cannot receive information directly from the base apparatus 1, for example, the flying apparatus 100 can receive information transmitted from the base apparatus 1 via the server 300. Similarly, when the base apparatus 1 cannot receive information directly from the flying apparatus 100, for example, the base apparatus 1 can receive information transmitted from the flying apparatus 100 via the server 300.

Next, the functional configuration of the flying apparatus 100 according to an embodiment is described.

Figure 3:
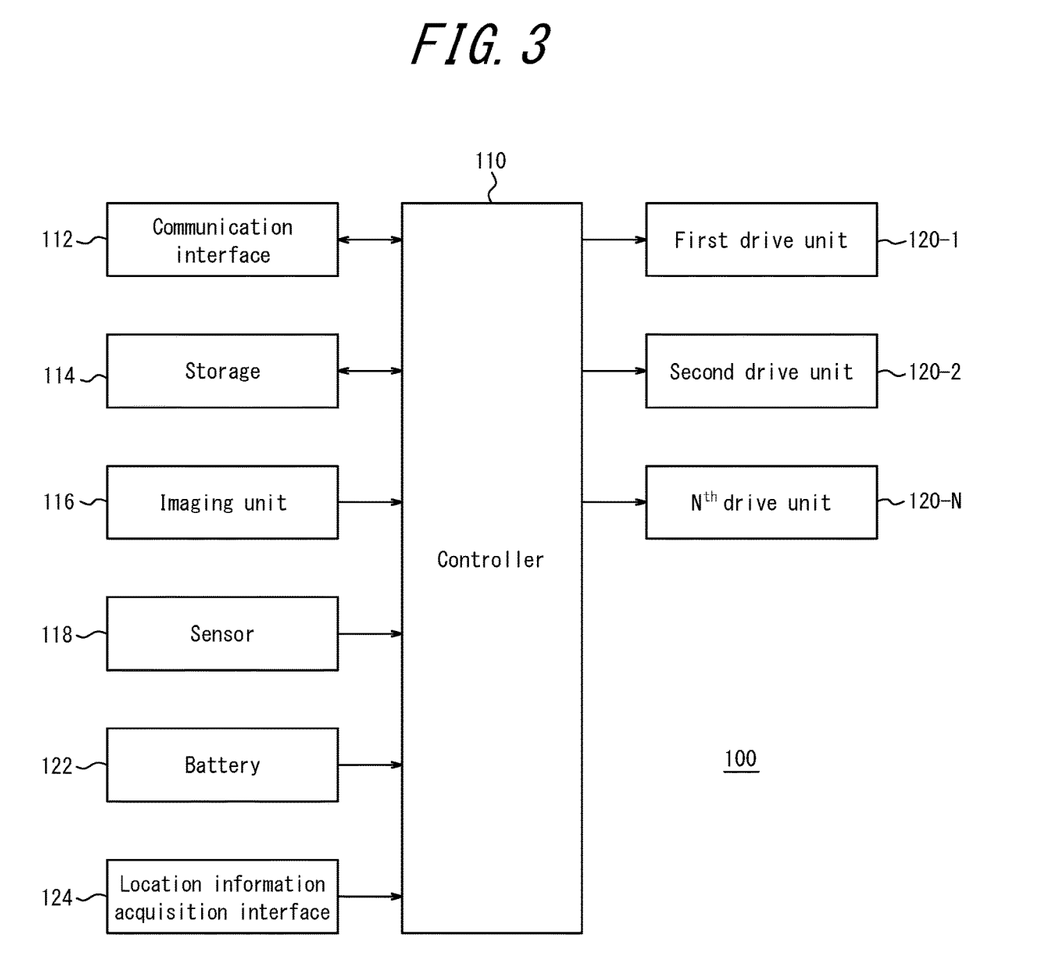
FIG. 3 is a functional block diagram illustrating the schematic configuration of a flying apparatus according to an embodiment.

FIG. 3 is a functional block diagram illustrating the schematic configuration of the flying apparatus 100 according to an embodiment. As illustrated in FIG. 3, the flying apparatus 100 according to an embodiment includes a controller 110, a first drive unit 120-1, a second drive unit 120-2, and an N$^{th}$ drive unit 120-N, for example. Furthermore, the flying apparatus 100 according to an embodiment may, as appropriate, include a communication interface 112, a storage 114, an imaging unit 116, a sensor 118, a battery 122, a location information acquisition interface 124, and the like. The aforementioned controller 110, communication interface 112, storage 114, imaging unit 116, sensor 118, and battery 122 may be installed or embedded at any location in the flying apparatus 100.

To provide control and processing capability for executing various functions, the controller 110 may include at least one processor, such as a central processing unit (CPU). The controller 110 may be implemented collectively by one processor, implemented by several processors, or implemented by individual processors. The processor may be implemented as a single integrated circuit (IC). The processor may be implemented as a plurality of integrated circuits and discrete circuits communicably connected to each other. The processor may be implemented based on various other known techniques. In an embodiment, the controller 110 may be configured by a CPU and a program executed by the CPU. Programs executed by the controller 110, the result of processing executed by the controller 110, and the like may be stored in the storage 114.

The communication interface 112 can implement various functions, starting with wireless communication. The communication interface 112 may implement communication with various communication methods, such as Long Term Evolution (LTE). The communication interface 112 may, for example, include a modem with a standardized communication method in the International Telecommunication Union Telecommunication Standardization Sector (ITU-T). The communication interface 112 may, for example, implement wireless communication by various methods such as WiFi or Bluetooth® (Bluetooth is a registered trademark in Japan, other countries, or both). The communication interface 112 may communicate wirelessly over an antenna with a communication interface of the base apparatus 1, for example. The communication interface 112 may communicate wirelessly over an antenna with a communication interface of the server 300, for example. Various information transmitted and received by the communication interface 112 may be stored in the storage 114, for example. The communication interface 112 may, for example, be configured to include an antenna for transmitting and receiving radio waves, an appropriate RF unit, and the like. The communication interface 112 can be configured using known techniques for wireless communication. A more detailed description of hardware is therefore omitted.

In an embodiment, the communication interface 112 may transmit various information related to the flying apparatus 100 itself to an external database, such as the server 300. For example, the communication interface 112 may transmit location information of the flying apparatus 100 at any time to an external destination.

The communication interface 112 may communicate wirelessly with a communication interface of another flying apparatus. In this case, the communication interface 112 may transmit various information related to the flying apparatus 100 itself to the other flying apparatus. For example, the communication interface 112 may transmit location information of the flying apparatus 100 itself at any time to the other flying apparatus. Furthermore, the communication interface 112 may receive various information related to the other flying apparatus from the other flying apparatus. For example, the communication interface 112 may receive location information of the other flying apparatus 100 at any time from the other flying apparatus.

The storage 114 stores various information acquired from the controller 110, the communication interface 112, and the like. The storage 114 also stores programs, executed by the controller 110, and the like. The storage 114 additionally stores various data, such as the calculation result from the controller 110. Furthermore, the storage 114 is described below as being capable of including a working memory or the like at the time the controller 110 operates.

The storage 114 can, for example, be configured by a semiconductor memory, a magnetic memory, or the like. The storage 114 is not limited to these examples, however, and can be any storage apparatus. For example, the storage 114 may be a storage medium such as a memory card inserted in the flying apparatus 100 according to the present embodiment. The storage 114 may be an internal memory of a CPU used as the controller 110.

The imaging unit 116 may be configured as various types of imaging devices, including a CCD image sensor, for example. The imaging unit 116 may be a camera device for the flying apparatus 100 to take aerial shots. The imaging unit 116 may be attached to the flying apparatus 100 so as to face the outside of the flying apparatus 100. The imaging unit 116 can capture still images or video from the viewpoint of the flying apparatus 100. Data of the still images or video captured by the imaging unit 116 may be provided to the controller 110 and stored in the storage 114. The imaging unit 116 can be configured using known techniques for imaging, such as a digital camera. A more detailed description of hardware is therefore omitted. Any number, as necessary, of imaging units 116 having any shape may be installed.

The sensor 118 may be any of various types of sensors from which information is to be acquired in the flying apparatus 100. For example, the sensor 118 may be a proximity sensor that detects objects located around the flying apparatus 100 when the flying apparatus 100 is flying and/or floating and when the flying apparatus 100 is docked on the base apparatus 1. In this case, the sensor 118 may detect a predetermined object approaching the flying apparatus 100 and/or the degree to which a predetermined object has approached the flying apparatus 100. Data, detected by the sensor 118, related to objects approaching the flying apparatus 100 may be provided to the controller 110 and stored in the storage 114. The sensor 118 may, for example, be an ultrasonic sensor or an infrared sensor. The sensor 118 may, however, be any device capable of detecting a predetermined object approaching the flying apparatus 100 and/or the degree to which a predetermined object has approached the flying apparatus 100. An ultrasonic sensor is adopted as the sensor 118 in the example described below. The sensor 118 can be configured using various known techniques for detecting the proximity of objects. A more detailed description of hardware is therefore omitted.

When the sensor 118 is an ultrasonic sensor, the sensor 118 can detect whether an object is present and the distance to the object by emitting ultrasonic waves towards an object using a transmitter and receiving the reflected waves using a receiver. Specifically, the distance from the sensor 118 to an object is calculated by calculating the relationship between the speed of sound and the time elapsed from emission of ultrasonic waves until reception.

The sensor 118 may detect the approach of a predetermined object such as another flying apparatus approaching from in front of the flying apparatus 100, for example. The sensor 118 may, for example, detect that the distance between the sensor 118 and the predetermined object has become equal to or less than a predetermined distance. During landing of the flying apparatus 100 on the base apparatus 1, the sensor 118 may detect the approach to the location on the base apparatus 1 where the flying apparatus 100 is to land. The sensor 118 may, for example, detect that the location where the flying apparatus 100 is to land on the base apparatus 1 has become equal to or less than a predetermined distance. Based on the results of such detection, the controller 110 may control flying and/or floating of the flying apparatus 100 during landing of the flying apparatus 100 on the base apparatus 1.

The first drive unit 120-1, the second drive unit 120-2, and the $N^{th}$ drive unit 120-N may, for example, each be configured by a motor driven by electric power. When no distinction need be made, the first drive unit 120-1, the second drive unit 120-2, and the $N^{th}$ drive unit 120-N may simply be referred to as the "drive unit 120".

The drive unit 120 rotates the propellers of the flying apparatus 100. In greater detail, the first drive unit 120-1 rotates the first propeller of the flying apparatus 100, for example. The second drive unit 120-2 rotates the second propeller of the flying apparatus 100, for example. Similarly, the $N^{th}$ drive unit 120-N rotates the $N^{th}$ propeller of the flying apparatus 100, for example. Here, N may be an integer of one or greater. The number of drive units 120 included in the flying apparatus 100 may correspond to the number of propellers included in the flying apparatus 100. For example, in the case of including four propellers as in the flying apparatus 100 illustrated in FIG. 1, the number of drive units 120 included in the flying apparatus 100 may also be four (N=4).

In an embodiment, the controller 110 may control flying and/or floating of the flying apparatus 100 by controlling the rotation speed (number of revolutions per unit time) of the drive unit 120 or the like. For example, the controller 110 can cause the flying apparatus 100 to rise by performing control so that the rotation speed of all of the drive units 120 uniformly increases. The controller 110 can, for example, cause the flying apparatus 100 to descend by performing control so that the rotation speed of all of the drive units 120 uniformly decreases. Furthermore, the controller 110 can change the travel direction of the flying apparatus 100 by performing control so that the rotation speed differs between the drive units 120. The flight of the flying apparatus 100 using the propellers can be controlled with various known techniques. A more detailed description is therefore omitted.

In an embodiment, the drive unit 120 is not limited to rotary driving of a propeller. The drive unit 120 in an embodiment may, for example, drive a blade, a motor, or the like. In other words, the drive unit 120 may be a functional component that drives any element producing power such as lift and/or propulsion when the flying apparatus 100 flies and/or floats.

The battery 122 supplies power for the flying apparatus 100 to perform various operations. The battery 122 may, for example, be a lithium polymer (Li—Po) battery or a lithium-ion (Li-ion) battery. The battery 122 may be any other functional unit that supplies power. FIG. 3 illustrates an example in which the battery 122 is connected to the controller 110, but the battery 122 may supply power to each functional component of the flying apparatus 100 that requires a power supply. Various functional units for implementing functions of the flying apparatus 100 may be added to the functional block diagram of FIG. 3. An object transport functional unit may be included when the flying apparatus 100 is for transporting objects, for example. A pesticide spreading functional unit may be included when the flying apparatus 100 is for spreading pesticides, for example.

The location information acquisition interface 124 acquires information related to the location of the location information acquisition interface 124. The location information acquisition interface 124 may acquire location information based on a technique such as a global navigation satellite system (GNSS). A GNSS may include a satellite positioning system, such as global positioning system (GPS), GLONASS, Galileo, or quasi-zenith satellite system (QZSS). The location information acquisition interface 124 may be a location information acquisition device such as a GPS module. The location information acquisition interface 124 is not limited to a GPS module or the like and may be configured by any device capable of acquiring information related to location. The location information acquired by the location information acquisition interface 124 may include at least one of latitude information, longitude information, and altitude information. The location information acquired by the location information acquisition interface 124 is supplied to the controller 110. Based on the location information supplied by the location information acquisition interface 124, the controller 110 can identify the current location and the like of the flying apparatus 100.

Next, the functional configuration of the base apparatus 1 according to an embodiment is described.

Figure 4:
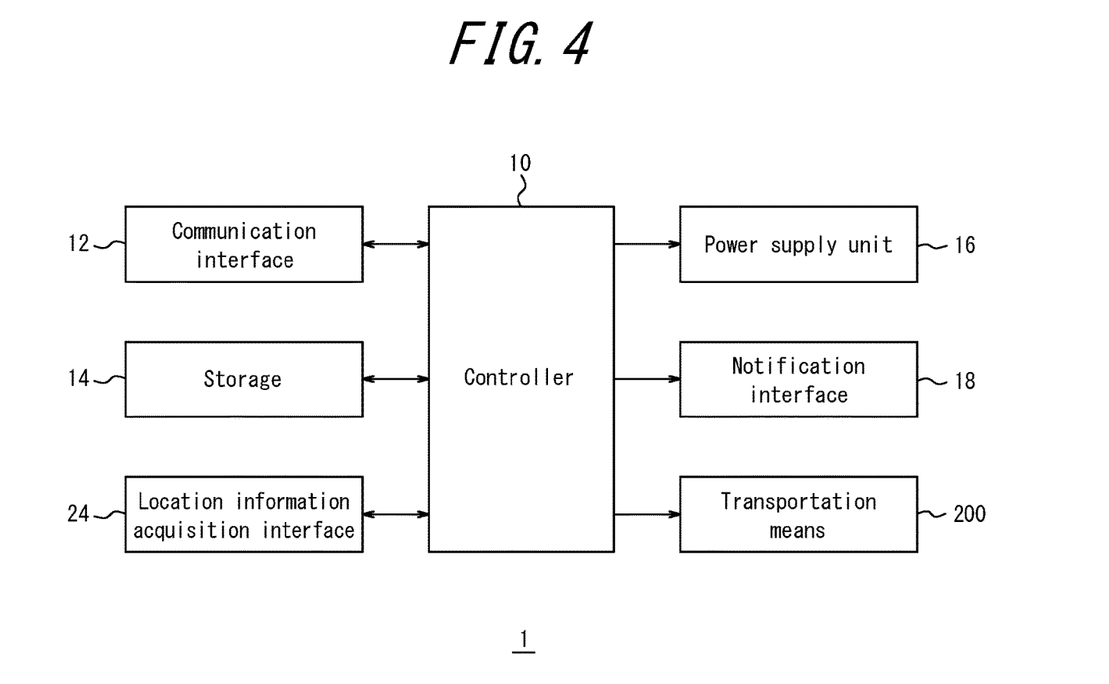
FIG. 4 is a functional block diagram illustrating the schematic configuration of a base apparatus according to an embodiment.

FIG. 4 is a functional block diagram illustrating the schematic configuration of the base apparatus 1 according to an embodiment. The base apparatus 1 according to an embodiment includes a controller 10, as illustrated in FIG. 4. Furthermore, the base apparatus 1 according to an embodiment may, as appropriate, include a communication interface 12, a storage 14, a power supply 16, a notification interface 18, a location information acquisition interface 24, and the like. The aforementioned controller 10, communication interface 12, storage 14, power supply 16, and notification interface 18 may be installed or embedded at any location in the base apparatus 1.

To provide control and processing capability for executing various functions, the controller 10 may include at least one processor, such as a central processing unit (CPU). The controller 10 may be implemented collectively by one processor, implemented by several processors, or implemented by individual processors. The processor may be implemented as a single integrated circuit (IC). The processor may be implemented as a plurality of integrated circuits and discrete circuits communicably connected to each other. The processor may be implemented based on various other known techniques. In an embodiment, the controller 10 may be configured by a CPU and a program executed by the CPU. Programs executed by the controller 10, the result of processing executed by the controller 10, and the like may be stored in the storage 14. Operations by the controller 10 of the base apparatus 1 according to an embodiment are further described below.

The communication interface 12 can implement various functions, starting with wireless communication. The communication interface 12 may implement communication with various communication methods, such as Long Term Evolution (LTE). The communication interface 12 may, for example, include a modem with a standardized communication method in the International Telecommunication Union Telecommunication Standardization Sector (ITU-T). The communication interface 12 may, for example, implement wireless communication by various methods such as WiFi or Bluetooth®. The communication interface 12 may communicate wirelessly over an antenna with the communication interface 112 of the flying apparatus 100, for example. The communication interface 12 may communicate wirelessly over an antenna with a communication interface of the server 300, for example. Various information transmitted and received by the communication interface 12 may be stored in the storage 14, for example. The communication interface 12 may, for example, be configured to include an antenna for transmitting and receiving radio waves, an appropriate RF unit, and the like. The communication interface 12 can be configured using known techniques for wireless communication. A more detailed description of hardware is therefore omitted.

In an embodiment, the communication interface 12 may transmit various information related to the base apparatus 1 itself to an external database, such as the server 300. For example, the communication interface 12 may transmit location information of the base apparatus 1 at any time to an external destination.

The communication interface 12 may communicate wirelessly with a communication interface of another flying apparatus. In this case, the communication interface 12 may transmit various information related to the base apparatus 1 itself to the other flying apparatus. For example, the communication interface 12 may transmit location information of the base apparatus 1 itself at any time to the other flying apparatus. Furthermore, the communication interface 12 may receive various information related to the other flying apparatus from the other flying apparatus. For example, the communication interface 12 may receive location information or the like of the other flying apparatus 100 at any time from the other flying apparatus.

The storage 14 stores various information acquired from the controller 10, the communication interface 12, and the like. The storage 14 also stores programs, executed by the controller 10, and the like. The storage 14 additionally stores various data, such as the calculation result from the controller 10. Furthermore, the storage 14 is described below as being capable of including a working memory or the like at the time the controller 10 operates.

The storage 14 can, for example, be configured by a semiconductor memory, a magnetic memory, or the like. The storage 114 is not limited to these examples, however, and can be any storage apparatus. For example, the storage 14 may be a storage medium such as a memory card inserted in the base apparatus 1 according to the present embodiment. The storage 14 may be an internal memory of a CPU used as the controller 10.

The power supply 16 supplies power to the battery of the flying apparatus 100 when, for example, the flying apparatus 100 is docked on the base apparatus 1. In this way, the flying apparatus 100 can charge its battery with electricity while docked on the base apparatus 1. The power supply 16 may supply power to the flying apparatus 100 wirelessly (wireless charging). The power supply 16 may also include a contact for connection at the time of supplying power to the flying apparatus 100. In an embodiment, the contact of the power supply 16 may be configured to touch a contact of the base apparatus 1 when the flying apparatus 100 docks on the base apparatus 1. In an embodiment, the base apparatus 1 can receive a supply of power as appropriate from a battery, power generator, or the like of the transportation means 200 in which the base apparatus 1 is installed.

The notification interface 18 provides notification of predetermined information supplied from the controller 10, for example, as visual information, auditory information, and/or tactile information. In an embodiment, the notification interface 18 may be a display for visually providing notification of location information or the like to the operator of the transportation means 200, for example. The display may be a display device such as a liquid crystal display (LCD), an organic EL display, an inorganic EL display, or the like. In this case, the operator of the transportation means 200 can recognize information related to the location to which the base apparatus 1 is to be moved by simply looking at the notification interface 18.

In an embodiment, the notification interface 18 may be an output interface for audibly providing notification of location information or the like to the operator of the transportation means 200, for example. The output interface here may be any type of speaker or the like. In this case, the operator of the transportation means 200 can recognize information related to the location to which the base apparatus 1 is to be moved by hearing the sound or audio outputted by the notification interface 18.

In an embodiment, the notification interface 18 may be an output interface for tactilely providing notification of location information or the like to the operator of the transportation means 200, for example. The output interface here may be a tactile sensation providing apparatus, such as a vibration device or the like. In this case, the operator of the transportation means 200 can recognize information related to the location to which the base apparatus 1 is to be moved by sense of touch, such as by vibration outputted by the notification interface 18. For example, the notification interface 18 may be embedded within the steering wheel of the transportation means 200 or the operation seat of the transportation means 200, and the notification interface 18 may generate vibration corresponding to the direction in which the transportation means 200 should proceed.

The location information acquisition interface 24 acquires information related to the location of the location information acquisition interface 124. The location information acquisition interface 24 may acquire location information based on a technique such as a global navigation satellite system (GNSS). A GNSS may include a satellite positioning system, such as global positioning system (GPS), GLONASS, Galileo, or quasi-zenith satellite system (QZSS). The location information acquisition interface 24 may be a location information acquisition device such as a GPS module. The location information acquisition interface 24 is not limited to a GPS module or the like and may be configured by any device capable of acquiring information related to location. The location information acquired by the location information acquisition interface 24 may include at least one of latitude information, longitude information, and altitude information. The location information acquired by the location information acquisition interface 24 is supplied to the controller 10. Based on the location information supplied by the location information acquisition interface 24, the controller 10 can identify the current location and the like of the base apparatus 1.

As illustrated in FIG. 4, the controller 10 in the base apparatus 1 according to an embodiment may be connected to transportation means 200 such as the one illustrated in FIG. 1. In this case, the controller 10 may, for example, be connected to a controller or the like for controlling or managing the transportation means 200. When the base apparatus 1 according to an embodiment is installed in the transportation means 200, the notification interface 18 may be omitted from the base apparatus 1 itself, and the transportation means 200 may include a predetermined notification interface. In this case, the controller 10 may be connected to the notification interface of the transportation means 200 or to a controller that controls the notification interface of the transportation means 200.

Operations of the flying apparatus 100 and the base apparatus 1 according to an embodiment are described below.

Figure 5:
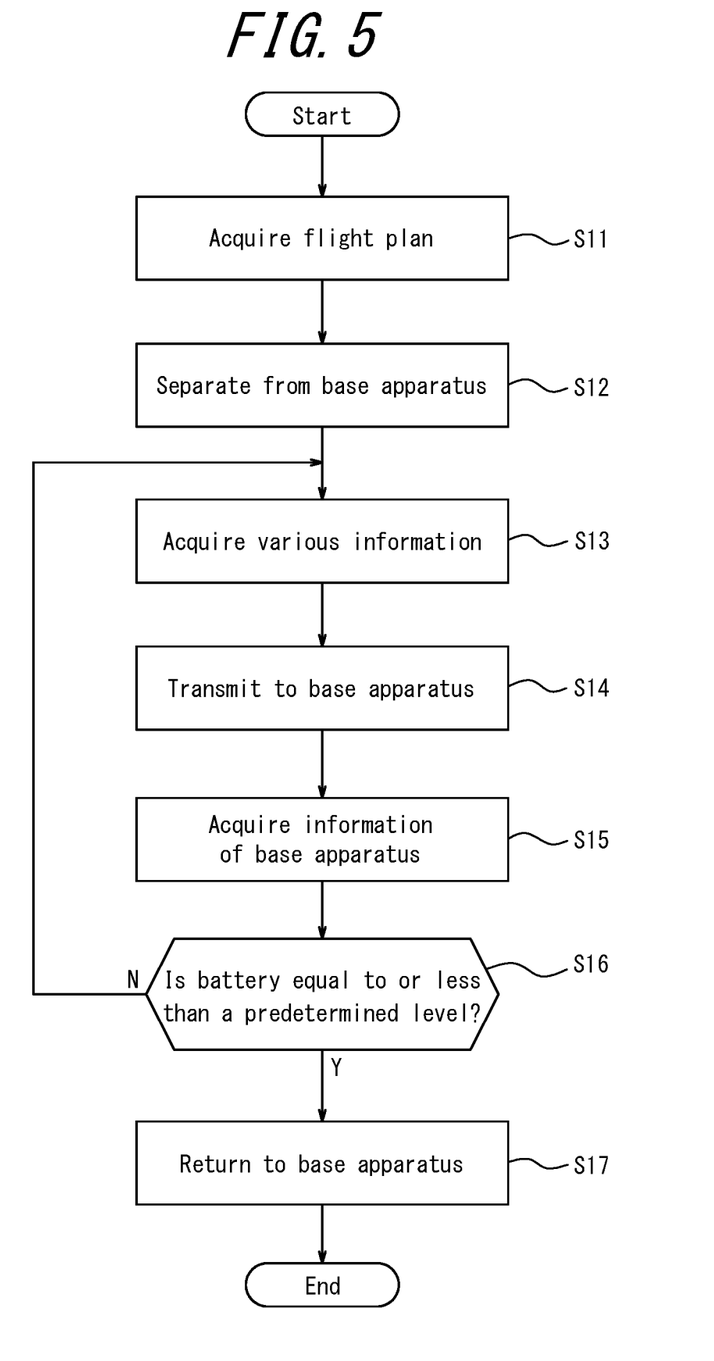
FIG. 5 is a flowchart illustrating operations of the flying apparatus according to an embodiment.

First, the operations of the flying apparatus 100 according to an embodiment are described. FIG. 5 is a flowchart illustrating operations of the flying apparatus 100 according to an embodiment.

When the operations illustrated in FIG. 5 start, the flying apparatus 100 according to an embodiment is assumed to be docked on the base apparatus 1 according to an embodiment. Here, the flying apparatus 100 according to an embodiment may be in a standby state before departing for flight.

When the operations illustrated in FIG. 5 begin, the flying apparatus 100 acquires a flight plan of the flying apparatus 100 from the base apparatus 1 (step S11). In greater detail, the communication interface 112 of the flying apparatus 100 receives information of the flight plan of the flying apparatus 100 from the communication interface 12 of the base apparatus 1 in step S11. Here, a flight plan may be prepared on the base apparatus 1 for each flying apparatus 100 and stored in the storage 14, for example.

In an embodiment, various information may be included in the flight plan of the flying apparatus 100 acquired in step S11. For example, at least one of the operation schedule of the flying apparatus 100, the travel distance of the flying apparatus 100, the battery capacity necessary for movement of the flying apparatus 100, and the like may be included in the flight plan of the flying apparatus 100.

Upon acquisition of the flight plan in step S11, the flying apparatus 100 separates from the base apparatus 1 (step S12). In greater detail, the controller 110 of the flying apparatus 100 controls the drive unit 120 in step S12 for takeoff from the base apparatus 1. When the base apparatus 1 has locked the flying apparatus 100 with a predetermined lock mechanism or the like, the base apparatus 1 releases the lock on the flying apparatus 100.

After separating from the base apparatus 1 in step S12, the flying apparatus 100 acquires various information while, for example, flying and/or floating towards a predetermined destination (step S13). In greater detail, the controller 110 of the flying apparatus 100 may perform control in step S13 for the imaging unit 116 to capture still images or video from the flying apparatus 100. The controller 110 of the flying apparatus 100 may perform control in step S13 for the sensor 118 to acquire various information in the flying apparatus 100. For example, when the sensor 118 is a temperature sensor, the controller 110 may perform control in step S13 to acquire the temperature at the location where the flying apparatus 100 is flying and/or floating. The sensor 118 may acquire various information when configured as various sensors, such as a humidity sensor, a barometric pressure sensor, an altitude sensor, a magnetic sensor, a radiation sensor, or the like. The controller 110 may store the information acquired in step S13 in the storage 114.

In an embodiment, the information acquired by the flying apparatus 100 in step S13 may include various types of information. For example, the information acquired by the flying apparatus 100 may include at least one of the date and time of operation, the location of operation, altitude, barometric pressure, temperature, humidity, the level (remaining charge) of the battery 122, the rotation speed of each propeller, the operation distance, the operation time, whether failure or problems have occurred, the number of times failure or problems have occurred, and the like.

Upon acquisition of various information in step S13, the flying apparatus 100 transmits the acquired information to the base apparatus 1 (step S14). In greater detail, the controller 110 of the flying apparatus 100 performs control in step S14 for the communication interface 112 to transmit the information acquired in step S13. The various information transmitted in this way from the communication interface 112 of the flying apparatus 100 is received by the communication interface 12 of the base apparatus 1. When the information acquired in step S13 has been stored in the storage 114, the controller 110 may read the stored information and then transmit the information to the communication interface 12 of the base apparatus 1. The controller 110 may transmit to the base apparatus 1 in step S14 following the timing at which information is acquired in step S13. Alternatively, the controller 110 may transmit information collectively to the base apparatus 1 in step S14 after a certain amount of the information acquired in step S13 accumulates in the storage 114. The controller 110 may also transmit information related to the level of the battery 122 of the flying apparatus 100 to the communication interface 12 of the base apparatus 1 in step S14.

After information is transmitted to the base apparatus 1 in step S14, the flying apparatus 100 acquires information of the base apparatus 1 (step S15). In greater detail, the communication interface 112 of the flying apparatus 100 receives information related to the base apparatus 1 from the communication interface 12 of the base apparatus 1 in step S15. The flying apparatus 100 may receive information of the location of the base apparatus 1 in step S15. The flying apparatus 100 may receive information in step S15 related to whether docking on the base apparatus 1 is possible. For example, the flying apparatus 100 may receive information related to a schedule of each type of flying apparatus that docks on the base apparatus 1. Based on the schedule of each type of flying apparatus that docks on the base apparatus 1, the flying apparatus 100 may receive information related to the schedule during which the flying apparatus 100 can dock on the base apparatus 1.

In an embodiment, the information related to the base apparatus 1 acquired by the flying apparatus 100 in step S15 may include various types of information. For example, the information related to the base apparatus 1 acquired by the flying apparatus 100 may include at least one of the housable number of flying apparatuses 100, the number of flying apparatuses currently housed, weather information at the location of the base apparatus 1, date and time information, and the like.

After acquiring the information of the base apparatus 1 in step S15, the flying apparatus 100 judges whether the level of the battery 122 is equal to or less than a predetermined level (step S16). In greater detail, the controller 110 of the flying apparatus 100 judges, in step S16, whether the level of the battery 122 that supplies power to the flying apparatus 100 is equal to or less than a predetermined level. In an embodiment, the controller 110 may judge, in step S16, whether the battery level is sufficient for flying to the base apparatus 1 where the flying apparatus 100 is scheduled to dock. In an embodiment, the controller 110 may judge whether the battery level exceeds the level sufficient for flying to the base apparatus 1, where the flying apparatus 100 is scheduled to dock, by a predetermined excess amount.

When the level of the battery 122 in step S16 is not judged to be equal to or less than the predetermined level, the controller 110 of the flying apparatus 100 returns to step S13 and continues processing. When the judgment of step S16 is "No", the battery 122 still has charge to spare after causing the flying apparatus 100 to acquire various information while flying and/or floating. Operations of the flying apparatus 100 therefore continue.

When the level of the battery 122 in step S16 is judged to be equal to or less than the predetermined level, the controller 110 of the flying apparatus 100 executes the processing of step S17. A judgment of "Yes" in step S16 means that if the flying apparatus 100 is caused to fly and/or float, the level of the battery 122 of the flying apparatus 100 might become insufficient before the flying apparatus 100 returns to the base apparatus 1. The flying apparatus 100 therefore needs to return to the base apparatus 1.

The flying apparatus 100 starts operations for returning to the base apparatus 1 in step S17. In greater detail, the controller 110 of the flying apparatus 100 performs control in step S17 to fly towards (return to) the base apparatus 1. Subsequently, when the flying apparatus 100 reaches the base apparatus 1, the controller 110 of the flying apparatus 100 performs control to land the flying apparatus 100.

The above-described operations enable the flying apparatus 100 to separate from the base apparatus 1 and also to return to the base apparatus 1. The base apparatus 1 from which the flying apparatus 100 separates and the base apparatus 1 to which the flying apparatus 100 returns may be the same base apparatus or different base apparatuses.

Figure 6:
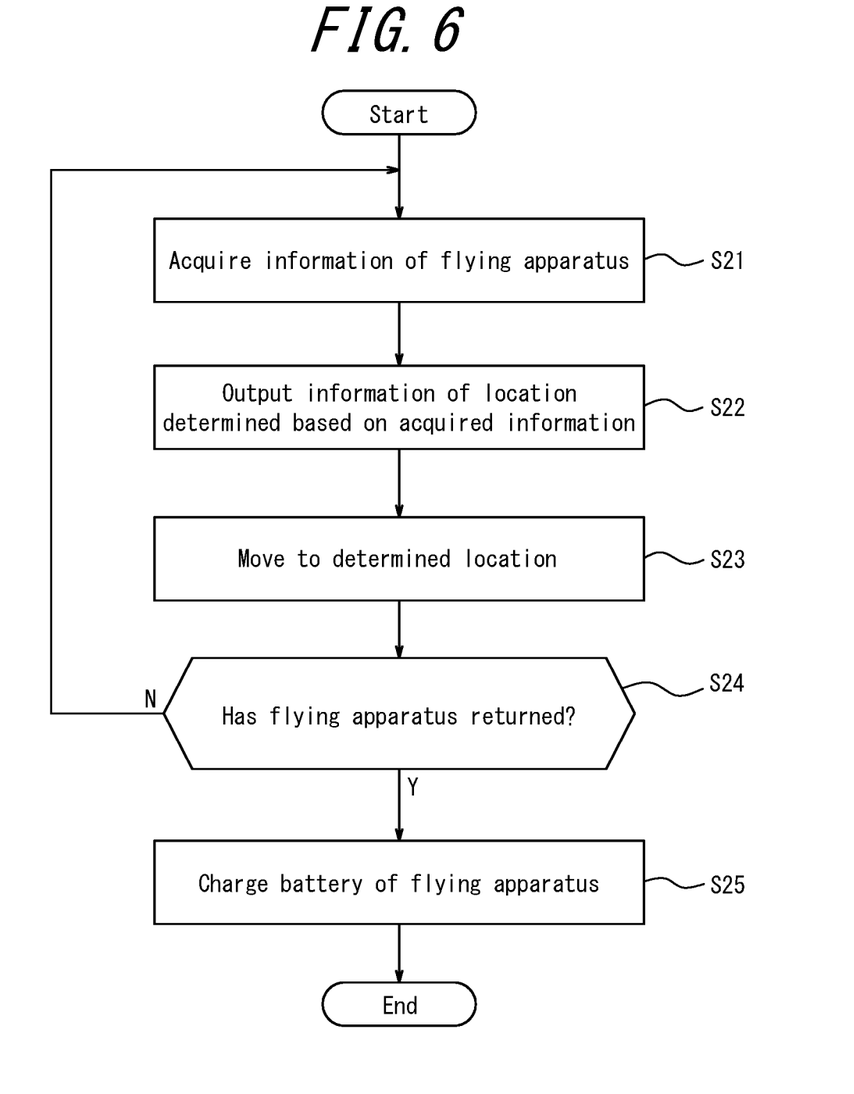
FIG. 6 is a flowchart illustrating operations of the base apparatus according to an embodiment.

Next, operations of the base apparatus 1 according to an embodiment are described. FIG. 6 is a flowchart illustrating operations of the base apparatus 1 according to an embodiment.

The below-described base apparatus 1 according to an embodiment may be installed in transportation means 200, as illustrated in FIG. 1. The transportation means 200 in which the below-described base apparatus 1 is installed is assumed to be at least partially autonomous. The autonomous driving of the transportation means 200 may, for example, be any level of autonomous driving from level 1 (L1) to level 5 (L5), excluding level 0 (L0), as defined by the Society of Automotive Engineers (SAE) International.

At the point when the operations in FIG. 6 begin, the base apparatus 1 according to an embodiment is assumed to be in a state such that the flying apparatus 100 according to an embodiment has separated and has not yet returned. In other words, at the point when the operations in FIG. 6 begin, at least one flying apparatus 100 is flying and/or floating, and this flying apparatus 100 has a flight plan to return next to the base apparatus 1. The base apparatus 1 according to an embodiment can be for docking of one or more flying apparatuses 100. In the case of more than one flying apparatus 100, all of the flying apparatuses 100 may be the same type, or they may be different types.

When no distinction need be made between a plurality of flying apparatuses scheduled to dock on the base apparatus 1, the flying apparatuses may simply be referred to as the "flying apparatus 100", even when these are of different types. Here, the flying apparatus 100 may be registered with the base apparatus 1 as a flying apparatus scheduled to dock on the base apparatus 1. The flying apparatus 100 may, for example, be registered with the base apparatus 1 as a flying apparatus belonging to the base apparatus 1. The flying apparatus 100 may, for example, request permission to belong to the base apparatus 1 and register with the base apparatus 1 as a flying apparatus whose request was granted. Furthermore, the flying apparatus 100 registered with the base apparatus 1 may, as appropriate, be capable of wireless communication with the base apparatus 1.

When the operations illustrated in FIG. 6 begin, the base apparatus 1 acquires various information of the flying apparatus 100 from the flying apparatus 100 (step S21). In greater detail, the communication interface 12 of the base apparatus 1 receives various types of information related to the flying apparatus 100 from the communication interface 112 of the flying apparatus 100 in step S21. The communication interface 12 of the base apparatus 1 may, in step S21, receive information transmitted from the flying apparatus 100 to the base apparatus 1 in step S14 of FIG. 5. The controller 10 of the base apparatus 1 may store the received information of the flying apparatus 100 in the storage 14, for example. In particular, the controller 10 of the base apparatus 1 may receive information related to the level of the battery 122 of the flying apparatus 100 in step S14.

After acquiring the information of the flying apparatus 100 in step S21, the controller 10 of the base apparatus 1 determines a target location to which the base apparatus 1 is to be moved based on the acquired information (step S22). The location to which the base apparatus 1 is to be moved is referred to below in this way as the "target location" as appropriate. A predetermined condition may be taken into consideration during the determination in step S22 of the target location to which the base apparatus 1 is to be moved. The predetermined condition may include a condition related to the level of the battery 122 of each of the one or more flying apparatuses 100. A condition related to local weather, for example, may be taken into consideration during the determination of the target location to which the base apparatus 1 is to be moved. Under this condition, the base apparatus 1 reduces the probability of selection as the target location, to which the base apparatus 1 is to be moved, in the case of bad weather such as rain or wind. A condition related to the degree of crowding in the area, for example, may be taken into consideration during the determination of the target location to which the base apparatus 1 is to be moved. Under this condition, the base apparatus 1 reduces the probability of selection as the target location, to which the base apparatus 1 is to be moved, for crowded areas. A predetermined condition including a condition related to the traffic volume of automobiles or the like in the area, for example, may be taken into consideration during the determination of the target location to which the base apparatus 1 is to be moved. Under this condition, the base apparatus 1 reduces the probability of selection as the target location, to which the base apparatus 1 is to be moved, for areas with a high volume of traffic. In this way, the controller 10 of the base apparatus 1 in an embodiment determines the target location to which the base apparatus 1 is to be moved based on a predetermined condition including a condition related to the level of the battery 122 of the at least one flying apparatus 100. Here, the base apparatus 1 according to an embodiment includes the transportation means 200 and can move. Therefore, in step S22, the controller 10 of the base apparatus 1 determines the location to which the base apparatus 1 is to be moved based on various information received from the flying apparatus 100. The way of determining the target location in step S22 is further described below.

After the target location is determined in this way, the controller 10 of the base apparatus 1 further performs control to output the determined target location (step S22). In step S22, the controller 10 of the base apparatus 1 outputs the information of the target location to the transportation means 200. In greater detail, the controller 10 of the base apparatus 1 may supply the information of the target location to a controller for controlling movement of the transportation means 200. After receiving the information of the target location, the controller of the transportation means 200 identifies the location based on the information of the target location and performs control to move the transportation means 200 to the location. The transportation means 200 performs autonomous driving as described above. In an embodiment, the transportation means 200 can therefore drive autonomously towards a certain location, such as the target location, once the location is designated. In this case, the transportation means 200 may identify the current location using GPS, for example, and drive autonomously towards a certain location such as the target location. Techniques related to such autonomous driving towards a designated location are known. A more detailed explanation is therefore omitted.

After the transportation means 200 (and the base apparatus 1) moves to the target location in step S22, the controller 10 of the base apparatus 1 judges whether the flying apparatus 100 that is scheduled to return to the base apparatus 1 has returned (step S24). When it is judged that the flying apparatus 100 has not yet returned in step S24, the controller 10 of the base apparatus 1 returns to step S21 and continues processing. When it is judged that the flying apparatus 100 has returned in step S24, the controller 10 of the base apparatus 1 executes the processing of step S25.

In step S25, the controller 10 of the base apparatus 1 may perform various types of control for supplying power to the battery 122 of the flying apparatus 100 that has returned. For example, the controller 10 of the base apparatus 1 performs control for the power supply 16 to supply power to the battery 122 of the flying apparatus 100. In this way, the battery 122 of the flying apparatus 100 is charged in step S25. In step S25, the controller 10 of the base apparatus 1 may communicate with the controller 110 of the flying apparatus 100 to supply the next flight plan of the flying apparatus 100, for example. In step S25, the controller 10 of the base apparatus 1 may perform control for various types of maintenance to be performed on the flying apparatus 100. In an embodiment, the controller 10 of the base apparatus 1 may perform control for the flying apparatus 100 to begin the next flight after step S25.

In this way, the base apparatus 1 according to an embodiment is for docking of at least one flying apparatus 100. The controller 10 of the base apparatus 1 according to an embodiment outputs information of the target location to which the base apparatus 1 is to be moved, the location being determined based on a predetermined condition including a condition related to the level of the battery 122 of at least one flying apparatus 100. In an embodiment, the controller 10 may output the information of the target location to the transportation means 200. In an embodiment, the transportation means 200 may perform autonomous driving based on the information of the target location.

Next, ways of determining the target location in the aforementioned step S22 are further described.

The base apparatus 1 according to an embodiment can be for docking of one or more flying apparatuses 100. The controller 10 of the base apparatus 1 according to an embodiment may, for example, determine the target location to be a location considered optimal for the one or more flying apparatuses 100 based on information received from the one or more flying apparatuses 100. In this case, the controller 10 of the base apparatus 1 may, as described above, determine the target location based on a predetermined condition including a condition related to the level of the battery 122 of each of the one or more flying apparatuses 100, for example.

The controller 10 of the base apparatus 1 may include, in the aforementioned predetermined condition, the condition that there be two or more flying apparatuses 100, and that the level of the battery 122 of each of the flying apparatuses 100 be equal to or greater than a predetermined level, for example. Here, the predetermined level of the battery 122 may be set appropriately for each of the flying apparatuses 100 based on the power required for each of the flying apparatuses 100 to fly to the base apparatus 1.

In this case, the target location determined when the predetermined condition is satisfied may be the location with the shortest average distance from the location of each of the flying apparatuses 100. For example, when four flying apparatuses 100 are scheduled to dock subsequently on the base apparatus 1, the distance between each of the four flying apparatuses 100 and the base apparatus 1 may be measured, and the location yielding the shortest average of these four distances may become the target location.

In this way, the base apparatus 1 according to an embodiment can move to an average location from the location of each of the flying apparatuses 100. The base apparatus 1 according to an embodiment is thereby present at a location where each of the flying apparatuses 100 can easily dock. Therefore, the base apparatus 1 according to an embodiment is suitable for docking of a plurality of flying apparatuses 100 and can increase convenience when the flying apparatuses 100 are operated.

The controller 10 of the base apparatus 1 may include, in the aforementioned predetermined condition, the condition that the level of the battery 122 of one of the at least one flying apparatus 100 is equal to or less than a predetermined level, for example. Here as well, the predetermined level of the battery 122 may be appropriately set in the flying apparatus 100 based on the power required for the at least one flying apparatus 100 to fly to the base apparatus 1.

In this case, the target location determined when the predetermined condition is satisfied may be a location near the flying apparatus 100 for which the level of the battery 122 is equal to or less than the predetermined level. In other words, when the level of the battery 122 of one flying apparatus 100 is becoming insufficient for providing the power required to fly to the base apparatus 1, a location near this flying apparatus 100 may be the target location. Here, the location near the flying apparatus 100 may be the location of the flying apparatus 100 itself. The location near the flying apparatus 100 may be a location in a range over which the level of the battery 122 of the flying apparatus 100 can provide the power required for flying to the base apparatus 1, taking into account the location of the other flying apparatuses 100.

This configuration enables the base apparatus 1 according to an embodiment to be moved near the flying apparatus 100 when the level of the battery 122 of the flying apparatus 100 becomes low. The base apparatus 1 according to an embodiment is thereby present at a location where the flying apparatus 100 can easily dock. Therefore, the base apparatus 1 according to an embodiment is suitable for docking of the flying apparatus 100 and can increase convenience when the flying apparatus 100 is operated.

The controller 10 of the base apparatus 1 may include, in the aforementioned predetermined condition, the condition that there be two or more flying apparatuses 100, and that the level of the battery 122 of each of the flying apparatuses 100 be equal to or less than a predetermined level. Here as well, the predetermined level of the battery 122 may be appropriately set in the flying apparatus 100 based on the power required for the at least one flying apparatus 100 to fly to the base apparatus 1.

In this case, the target location determined when the predetermined condition is satisfied may be a location based on priority set for the plurality of flying apparatuses 100 in each of which the level of the battery 122 is equal to or less than the predetermined level. For example, when four flying apparatuses 100 are scheduled to dock subsequently on the base apparatus 1, a priority is set for each of the four flying apparatuses 100. This priority may be set in advance on at least one of the base apparatus 1 and the flying apparatus 100 or may be specified when necessary based on various conditions. A location near the flying apparatus 100 with the highest set priority may become the target location, for example. Based on the location of the flying apparatuses 100 with the three highest set priorities, a location yielding the shortest average distance from the locations of the three flying apparatuses 100 may become the target location, for example.

In this way, the base apparatus 1 according to an embodiment can move to a location corresponding to the priority of each of the flying apparatuses 100. The base apparatus 1 according to an embodiment is thereby present at a location where at least one of the flying apparatuses 100 can easily dock. Therefore, the base apparatus 1 according to an embodiment is suitable for docking of at least one flying apparatus 100 among a plurality of flying apparatuses 100 and can increase convenience when the flying apparatus 100 is operated.

Other features of the base apparatus 1 according to an embodiment are described below.

In the above embodiment, the transportation means 200 has been described as at least partially autonomous. In an embodiment, however, the transportation means 200 may be means for transportation by manual operation, rather than autonomous driving. In this case, the controller 10 of the base apparatus 1 may provide notification of the target location from the notification interface 18 in step S22 of FIG. 6 instead of outputting the target location to the transportation means 200, for example. As described above, the notification interface 18 can provide notification of predetermined information supplied from the controller 10, for example, as visual information, auditory information, and/or tactile information. Accordingly, the operator of the transportation means 200 can learn the target location, i.e. the location to which the base apparatus 1 is to be moved, based on the information provided by the notification interface 18. In an embodiment, the operation to move to the target location in step S23 may therefore be performed by a person operating the transportation means 200 instead of autonomously by the transportation means 200. Instead of performing autonomous driving, the transportation means 200 in an embodiment may be remotely controlled by wireless communication or the like, without a person riding the transportation means 200.

In this way, the controller 10 in an embodiment may output the information of the target location as a notification from the notification interface 18. In this case the notification interface 18 may provide notification of the information of the target location as visual information, auditory information, and/or tactile information.

In the above embodiment, the target location (the location to which the base apparatus 1 is to be moved) has been described as being determined by the controller 10 of the base apparatus 1 in step 22. The controller 10 of the base apparatus 1 may, however, transmit necessary information from the communication interface 12 to the server 300 illustrated in FIG. 2, for example, and the server 300 (rather than the controller 10 of the base apparatus 1) may determine the target location. In this case, the controller 10 of the base apparatus 1 may, in step 22, further receive information related to the target location determined by the server 300 from the communication interface 12.

In the base apparatus 1 according to an embodiment, a solar cell may be connected to the base apparatus 1, for example, to charge the battery of the flying apparatus 100. The power generated using sunlight may be used to charge a predetermined storage cell. The battery of the flying apparatus 100 may be charged in the base apparatus 1 by contactless charging (such as wireless charging) or by connecting to a contact point, for example.

In the base apparatus 1 according to an embodiment, it may be judged whether the flying apparatus 100 can dock. For example, a flying apparatus 100 registered in a predetermined base apparatus 1 in advance by a predetermined contract or the like may be permitted to dock on the base apparatus 1. In this case, a flying apparatus 100 not registered in the predetermined base apparatus 1 in advance by a predetermined contract may be denied permission to dock on the base apparatus 1. If a flying apparatus 100 not permitted to dock attempts to dock on the base apparatus 1, the controller 10 may perform control to take measures such as not operating a predetermined lock mechanism on the docked flying apparatus 100.

When it is judged in this way whether a flying apparatus 100 can dock, a plurality of flying apparatuses 100 can be envisioned as being identified in various ways. For example, the base apparatus 1 may identify a plurality of flying apparatuses 100 by direct wireless communication with the flying apparatuses 100. The base apparatus 1 may, for example, identify a plurality of flying apparatuses 100 based on information acquired from an external database, such as the server 300. The base apparatus 1 may, for example, identify a plurality of flying apparatus 100 by using an imaging unit 36 to read a QR Code® (QR code is a registered trademark in Japan, other countries, or both), attached to the flying apparatus 100, when the flying apparatus 100 approaches. Furthermore, an RF tag may be attached to the flying apparatus 100, for example, and a power supply may be received from the base apparatus 1 (without using power of the flying apparatus 100) to read the RF tag of the flying apparatus 100 for identification.

In the above embodiment, the flying apparatus 100 may fly or float autonomously by autopilot or may be remotely controlled by a human operator.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various functional components may be reordered in any logically consistent way. A plurality of functional components may be combined into one, or one functional component may be divided. The embodiments of the present disclosure are not limited to being implemented precisely as described and may be implemented by combining or partially omitting the features thereof as appropriate.

The above embodiments are not limited to being implemented as the base apparatus 1. For example, the above embodiments may be implemented as a control method of a device such as the base apparatus 1. Furthermore, the above embodiments may be implemented as a control program of a device such as the base apparatus 1, for example.

REFERENCE SIGNS LIST

1 Base apparatus
10 Controller
12 Communication interface
14 Memory
16 Power supply unit
18 Notification interface
100 Flying apparatus
110 Controller
112 Communication interface
114 Storage
116 Imaging unit
118 Sensor
120 Drive unit
122 Battery
200 Transportation means
300 Server

The invention claimed is:

1. A base apparatus for docking of at least one flying apparatus of a plurality of flying apparatuses, the base apparatus comprising:
a controller configured to output information of a target location to which the base apparatus is to be moved, the target location being determined based on a predetermined condition including a condition related to a respective battery level of a respective battery of each of the plurality of flying apparatuses including the at least one flying apparatus,
wherein
when the battery level of one of the at least one flying apparatus is equal to or less than a predetermined level, the target location is determined to be a location within a determined distance from the one of the at least one flying apparatus with the battery level equal to or less than the predetermined level, such that the target location is in a range over which the battery level of the battery of the one of the at least one flying apparatus is sufficient to provide power required for flying the one of the at least one flying apparatus to the base apparatus, and
when the battery level of each flying apparatus among the plurality of flying apparatuses is equal to or less than a predetermined level, the target location is determined based on priority set for the plurality of flying apparatuses.

2. The base apparatus of claim 1, wherein the controller is configured to output the information of the target location from a notification interface as a notification comprising at least one of, or any combination of, visual information, auditory information, and tactile information.

3. The base apparatus of claim 1,
wherein the base apparatus is installed in transportation means; and
wherein the controller is configured to output the information of the target location to the transportation means.

4. The base apparatus of claim 3, wherein the transportation means performs autonomous driving based on the information of the target location.

5. The base apparatus of claim 3, wherein the transportation means is driven by a driver to approach the target location based on the information of the target location.

6. The base apparatus of claim 1, wherein when the battery level of each flying apparatus among the plurality of flying apparatuses is equal to or greater than a predetermined level, the target location is determined to be a location with a shortest average distance from a location of each flying apparatus.

7. The base apparatus of claim 1, wherein
the target location is in a range over which the battery level of the battery of the one of the at least one flying apparatus is sufficient to provide power required for flying the one of the at least one flying apparatus to the base apparatus, taking into account the location of the other flying apparatuses.

8. A control method of a base apparatus for docking of at least one flying apparatus of a plurality of flying apparatuses, the control method comprising:
determining a target location to which the base apparatus is to be moved based on a predetermined condition including a condition related to a respective battery level of a respective battery of the plurality of flying apparatuses including the at least one flying apparatus; and outputting information of the target location,
wherein when the battery level of one of the at least one flying apparatus is equal to or less than a predetermined level, the target location is determined to be a location within a determined distance from the one of the at least one flying apparatus with the battery level equal to or less than the predetermined level, such that the target location is in a range over which the battery level of the battery of the one of the at least one flying apparatus is sufficient to provide power required for flying the one of the at least one flying apparatus to the base apparatus,
and when the battery level of each flying apparatus among the plurality of flying apparatuses is equal to or less than a predetermined level, the target location is determined based on priority set for the plurality of flying apparatuses.

9. A non-transitory computer-readable recording medium storing computer program instructions, which when executed by a base apparatus for docking of at least one flying apparatus of a plurality of flying apparatuses, cause a computer of the base apparatus to: determine a target location to which the base apparatus is to be moved based on a predetermined condition including a condition related to a respective battery level of a respective battery of the plurality of flying apparatuses including the at least one flying apparatus;
and output information of the target location,
wherein when the battery level of one of the at least one flying apparatus is equal to or less than a predetermined level, the target location is determined to be a location within a determined distance from the one of the at least one flying apparatus with the battery level equal to or less than the predetermined level, such that the target location is in a range over which the battery level of the battery of the one of the at least one flying apparatus is sufficient to provide power required for flying the one of the at least one flying apparatus to the base apparatus,
and when the battery level of each flying apparatus among the plurality of flying apparatuses is equal to or less than a predetermined level, the target location is determined based on priority set for the plurality of flying apparatuses.

* * * * *